United States Patent
Campbell et al.

(10) Patent No.: US 11,296,640 B2
(45) Date of Patent: Apr. 5, 2022

(54) MOTOR DRIVE WITH DYNAMIC INTERVAL COMMUNICATION

(71) Applicant: ROCKWELL AUTOMATION TECHNOLOGIES, INC., Mayfield Heights, OH (US)

(72) Inventors: Alan J. Campbell, Mequon, WI (US); Chris K. Radtke, Mequon, WI (US); Joseph D. Riley, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/693,056

(22) Filed: Aug. 31, 2017

(65) Prior Publication Data

US 2018/0175771 A1  Jun. 21, 2018

Related U.S. Application Data

(60) Provisional application No. 62/437,423, filed on Dec. 21, 2016.

(51) Int. Cl.
*H02P 27/06* (2006.01)
*H02M 5/458* (2006.01)
(Continued)

(52) U.S. Cl.
CPC .......... *H02P 27/06* (2013.01); *G05B 19/4148* (2013.01); *H02M 5/4585* (2013.01);
(Continued)

(58) Field of Classification Search
CPC ... H02P 27/06; H02M 5/4585; G05B 19/4148
(Continued)

(56) References Cited

U.S. PATENT DOCUMENTS 4,550,402 A * 10/1985 Gable ..................... H04L 29/00
370/438
5,737,536 A * 4/1998 Herrmann ........... G06F 17/3048
707/E17.005
(Continued)

FOREIGN PATENT DOCUMENTS

JP  2006192602 A * 7/2006
KR  20120007657 A   1/2012

OTHER PUBLICATIONS

Extended European Search Report for Application No. 17208394.1 dated May 28, 2018 (8 pages).
(Continued)

*Primary Examiner* — Kawing Chan
(74) *Attorney, Agent, or Firm* — Fletcher Yoder, P.C.

(57) ABSTRACT

Control circuitry of a motor drive provides commands for operation of power circuitry in cooperation with peripheral circuits and devices, such as converters, inverters, feedback precharge circuits, feedback devices, interfaces, and so forth. The communications with the devices is handled by fiber optic communications circuitry that implements a flexible scheme of dynamic interval communication depending upon the capabilities and design of the peripheral circuit or device. The communication may be in accordance with a plurality of predetermined schemes, each having different data transfer rates, data allocations, and so forth. The schemes may each set communications protocols (e.g., timing) over a high speed interface between the fiber optic communications circuitry on one side and over fiber optic cables to the peripherals on another side.

17 Claims, 8 Drawing Sheets

(51) Int. Cl.
*G05B 19/414* (2006.01)
*H02M 1/00* (2006.01)

(52) U.S. Cl.
CPC .............. *G05B 2219/33189* (2013.01); *G05B 2219/41293* (2013.01); *H02M 1/0012* (2021.05)

(58) Field of Classification Search
USPC ........................................................ 318/503
See application file for complete search history.

(56) References Cited

U.S. PATENT DOCUMENTS

| | | | | |
|---|---|---|---|---|
| 5,825,618 | A * | 10/1998 | Schnoor | H05K 5/0021 361/679.6 |
| 2008/0065805 | A1 * | 3/2008 | Wu | G06F 1/186 710/301 |
| 2009/0066282 | A1 | 3/2009 | Worrall | |
| 2009/0177319 | A1 * | 7/2009 | Garibaldi | G07F 11/002 700/236 |
| 2010/0123420 | A1 * | 5/2010 | Campbell | H02P 31/00 318/558 |
| 2010/0123423 | A1 | 5/2010 | Campbell | |
| 2012/0331195 | A1 | 12/2012 | Pipho | |
| 2014/0328352 | A1 * | 11/2014 | Mabuchi | H04L 12/4035 370/451 |
| 2015/0003259 | A1 * | 1/2015 | Gao | H04L 45/18 370/244 |

OTHER PUBLICATIONS

Official Action for EP Application No. 17208394.1 dated Jul. 23, 2019, 6 pages.
Decision to Grant a European patent pursuant to Article 97(1) EPC for Application No. 17208394.1 dated May 20, 2021, 2 pages.
Official Action for EP Application No. 17208394.1 dated May 11, 2020, 4 pages.

* cited by examiner

MOTOR DRIVE WITH DYNAMIC INTERVAL COMMUNICATION

CROSS-REFERENCE TO RELATED APPLICATIONS

This application claims priority from and the benefit of U.S. Provisional Application Ser. No. 62/437,423, entitled "Motor Drive With Dynamic Interval Communication," filed Dec. 21, 2016, which is hereby incorporated by reference in its entirety.

BACKGROUND

The invention relates generally to automation systems and equipment, such as electric motor drives, and particularly to techniques for flexibly communicating with functional circuits coupled to control circuitry in such systems.

A wide range of systems in industry and other applications call for automated control by driving loads, such as electric motors. Industrial automation equipment provides for such needs, and may be adapted to particular settings to sense and provide feedback of key system parameters, for closed loop control of motors and other loads. In motor drives, for example, sophisticated control circuitry allows for implementation of control schemes that produce variable frequency output to drive motors at desired speeds. Many ancillary devices and circuits may be interfaced with the control circuitry to accomplish different control tasks and strategies. In certain currently available motor drives, for example, functional circuits may be connected to master control circuits to provide data necessary for system functions and control functions. As these functional circuits become more sophisticated, it is becoming apparent that different interface protocols, speeds, and physical hardware are required to adapt control circuitry to a wide range of power ratings. Further, as equipment becomes available, improvements in speeds and capabilities need to be accommodated while allowing certain existing or legacy circuits to continue to be offered and functional.

Current technologies do not, however, permit this flexibility. There is a keen need for new approaches to communication both within such equipment and between the equipment and peripheral devices. The need is particularly acute in the field of industrial automation where real or near real time demands are made by control requirements.

BRIEF DESCRIPTION

A system comprises converter circuitry to convert incoming three-phase power to DC power, inverter circuitry to convert the DC power to three-phase controlled frequency AC power to drive a motor, and control circuitry coupled to the inverter circuitry and configured to apply control signals to the inverter circuitry for conversion of the DC power to the controlled frequency AC power. Fiber optic communications circuitry is coupled for data communication between the control circuitry and a plurality of peripheral devices including the inverter circuitry, the fiber optic communications circuitry implementing a dynamic interval communications protocol having a plurality of data transfer schemes each having different respective data transfer intervals and data allocations.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As functional circuits become more sophisticated, it is becoming apparent that different interface protocols, speeds, and physical hardware are required to adapt control circuitry to a wide range of power ratings. Further, as equipment becomes available, improvements in speeds and capabilities need to be accommodated while allowing certain existing or legacy circuits to continue to be offered and functional.

Figure 1A:
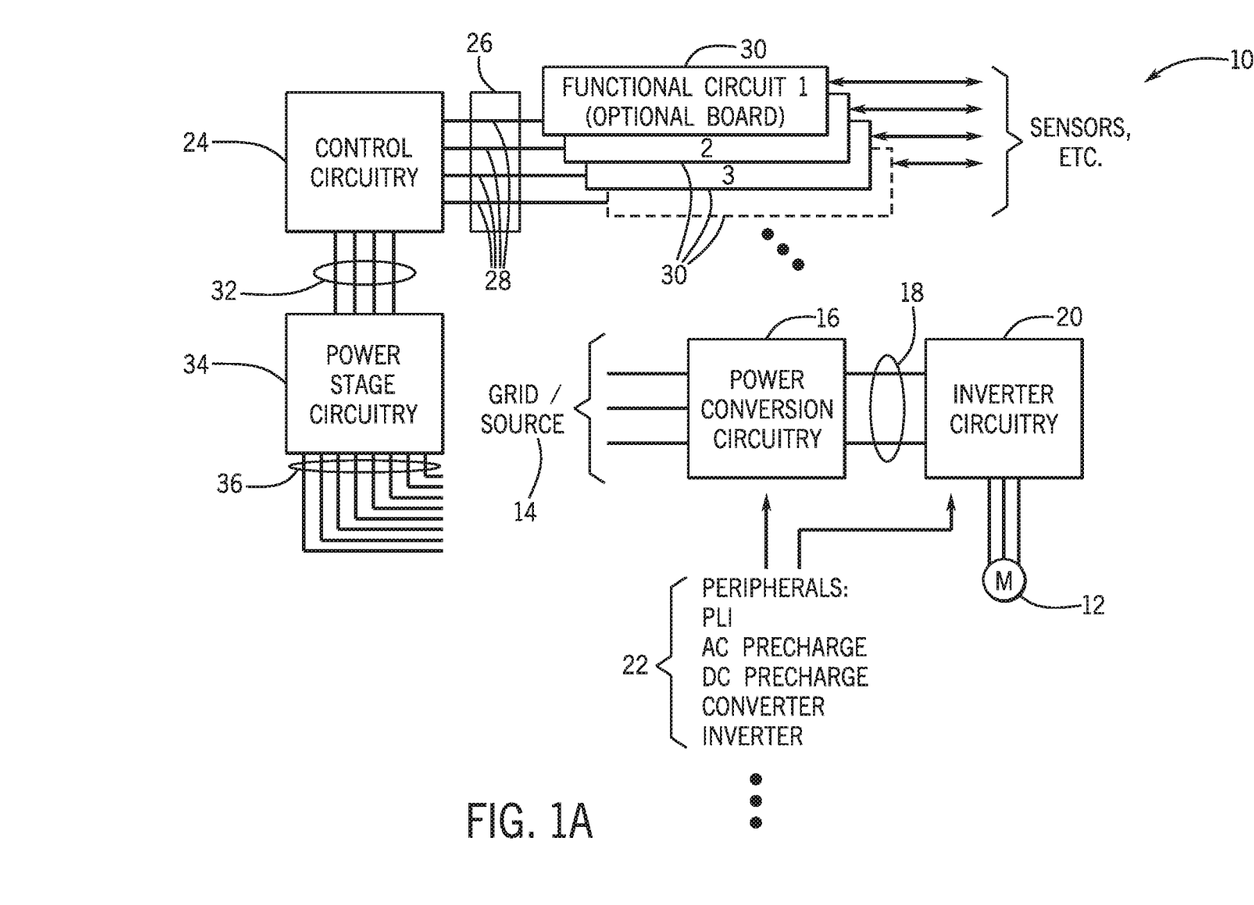
FIG. 1A is a diagrammatical view of an industrial automation system in the form of a motor drive utilizing aspects of the disclosed techniques.

With the foregoing in mind, FIG. 1A illustrates an example industrial automation system 10 for performing automation tasks and utilizing novel communication techniques as disclosed here. The automation system 10 illustrated comprises a motor drive designed to drive an electric motor 12 at controlled speeds. The drive may regulate output of the motor 12 in terms of speed, torque, power, or a combination of such parameters. In a practical application, the motor 12 would be coupled to a load to be driven to carry out industrial automation tasks (e.g., a pump, conveyor, transmission equipment, and so forth). The system may be part of a larger automation system that automates entire groups of tasks, such as for manufacturing, material handling, mining, or any other useful application. Further, the system may be in physical, data, and logical communication with other systems and components by networks, both wired and wireless, at a single location or at dispersed locations in an organization.

Figure 1B:
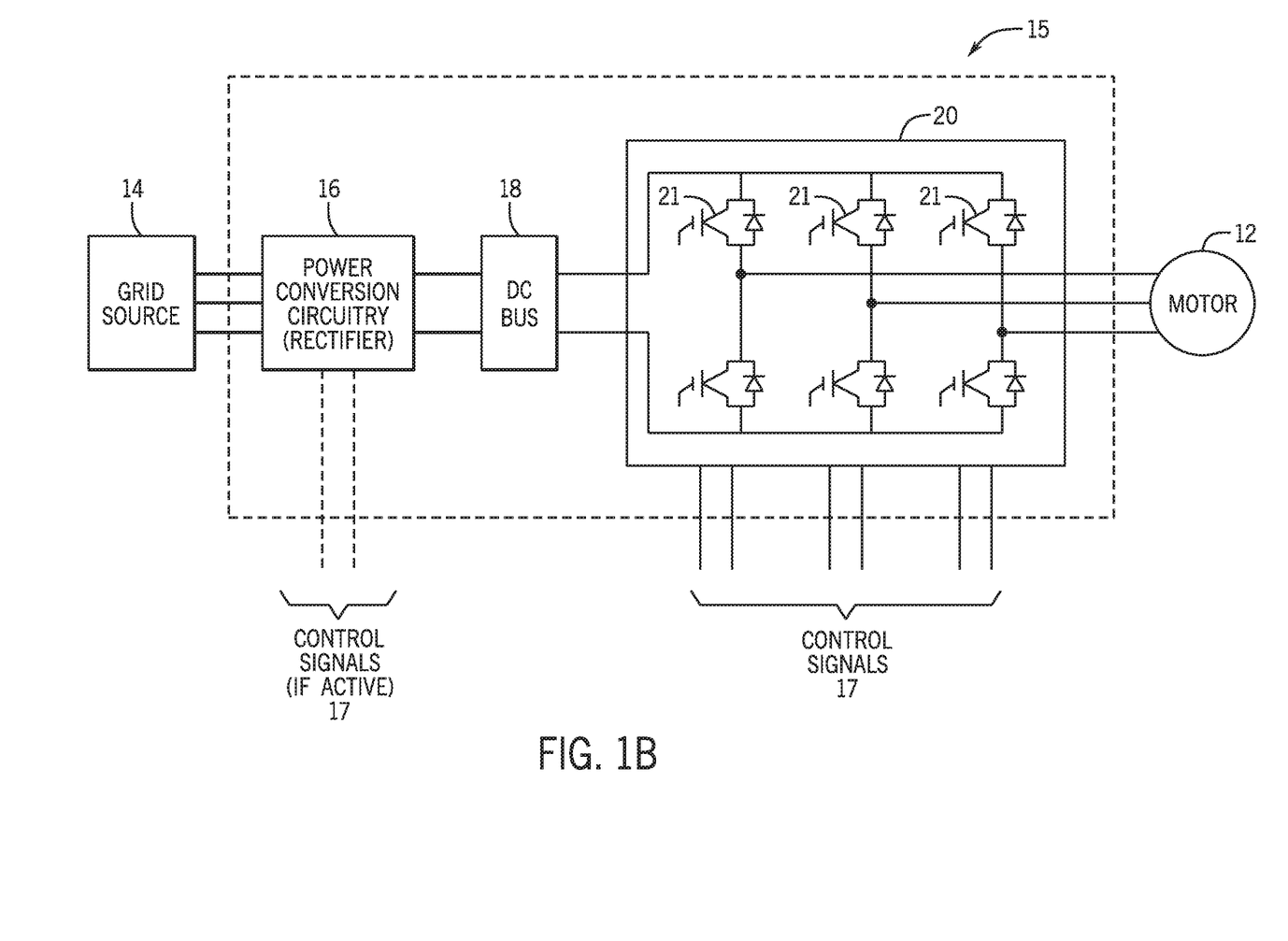
FIG. 1B is a diagrammatical view of certain of the components of the system of FIG. 1A.

In the illustrated embodiment, the motor 12 is driven by power received from a grid or source 14. An embodiment of a power structure 15 is illustrated in FIG. 1B. The grid 14 may comprise the electric power grid of a location or region, or any other suitable source of power may be called upon. The illustrated embodiment makes use of three phase power that is applied to power conversion circuitry 16, although a single phase embodiment may be conceived by anyone skilled in the art. The power conversion circuitry 16, also known as a rectifier, converts the three-phase power to direct current (DC) power. The power conversion circuitry 16 may comprise passive elements that do not require control, or may be designed for active control of power conversion. If active, power structure control signals 17 may control the power conversion circuitry 16 for proper modulation of power. After rectification, all phases of the incoming power are combined to provide DC power to a direct current bus 18. Other components such as inductors, resistors, and capacitors may be included in the DC bus for smoothing the rectified DC voltage waveform.

The DC power from the bus is applied to inverter circuitry 20 where it is converted to controlled frequency alternating current (AC) output, in this case three-phase output. The inverter circuitry 20 may comprise various physical and electrical configurations, such as based upon an array of power electronic switches, such as insulated-gate bipolar transistors (IGBTs). By controlling the gate signals to such switches, a synthesized waveform may be output at the desired frequency for driving the motor 12. In the illustrated embodiment, within the inverter 20, for each phase, two IGBTs 21 are coupled in series, collector to emitter, between the high side and low side of the DC bus 18. Three of these transistor pairs are coupled in parallel to the DC bus 18, for a total of six transistors 21. Power structure control signals 17 cause the transistors 21 to rapidly close and open, resulting in a three phase waveform output across three terminals. It should be noted that although the power structure 15 is illustrated as including the power conversion circuitry 16, DC bus 18, and inverter circuitry 20, some components may be passive or unnecessary in certain applications. In such a case, the power structure 15 is to include those controlled components through which electrical power is modulated.

The motor 12 and drive circuitry may be designed for any suitable power rating, often referred to by the frame size of the motor. The present techniques are not limited to any particular power rating or range. Moreover, the circuitry disclosed may be designed for starting, driving, braking, and any suitable control of the motor 12. In some applications, for example, dynamic braking is not provided, while in others the inverter 20 and power conversion circuitry 16 cooperate to provide such a dynamic braking. Further, the circuitry may be designed with more than one power module, such as multiple power converters 16 and/or inverters 20, which operate in parallel to provide higher power and output ratings.

The circuitry used to control the power conversion circuitry 16 and inversion circuitry 20 may include a range of peripherals 22 as illustrated in FIG. 1A. In this approach, the power conversion circuitry 16 and the inverter circuitry 20 may themselves be considered as peripherals 22, and other peripherals may include precharge circuits, additional conversion circuits, additional inverter circuits, a power layer interface (PLI), and so forth. All of the circuitry operates under the control of control circuitry 24. The control circuitry 24, as discussed below, typically carries out predefined control routines, or those defined by an operator, based upon parameters set during commissioning of the equipment and/or parameters sensed and fed back to the control circuitry during operation.

The control circuitry 24 may generally comprise one or more circuit boards which may be mounted in a framework with other circuit boards. This framework comprises a pod for mounting circuit boards within, and also houses a physical backplane 26 that allows independent communication via separate and independent data communication lines 28. The physical backplane 26 may be a multilayer printed circuit board (PCB), and is dedicated for functional circuit data transmission, but does not process signals. The control circuit board 24 may be directly connected to this backplane 26, such as via on dashboard traces, tabs, extensions, cables, and so forth. Each independent data line 28 allows for communication with a functional circuit 30, sometimes referred to as an option board. These functional circuits 30 may carry out a wide range of operations, including detecting and feeding back parameters (e.g. currents, voltages, and speeds), regulating certain operations based on loads and conditions, and so forth.

The functional circuits 30 may comprise profiles that may be stored in the functional circuit, in the control circuit board 24, or in any other memory device associated with the system. Such profiles are described, for example, in U.S. Pat. No. 8,248,009, issued to Campbell et al. on Aug. 21, 2012 and entitled Motor Controller having Integrated Communications Configurations, which is hereby incorporated into the present disclosure by reference in its entirety. Moreover, the functional circuits 30 may have different data exchange rate capabilities adapted to their functions. As discussed below, the use of independent data communication lines 28 in the physical backplane 26, and an adaptable technique for determining protocols and data rates allow for the use of different functional circuits 30 having such different rates. Additionally, the use of independent data communication lines 28 allow functional circuit 30 to each operate at its optimum rate instead of requiring each to run at a common rate, which may be suboptimal for functional circuits with faster capabilities. This approach allows for the design of a wide range of functional circuits 30 and continuously improved and evolved functional circuits, while allowing the system to operate with existing or legacy circuits that may have reduced capabilities for data exchange rates.

The control circuitry 24 additionally employs a high speed interface (HSI) 32 to transfer control, feedback, and other signals to power stage circuitry 34. The power stage circuitry 34 communicates with peripherals 22 such as the inverter circuitry 20 via communication lines 36. These communication lines 36 transfer control, feedback, and other signals between peripherals 22 such as inverter circuitry 20 and the power stage circuitry 34, and thus the control circuitry.

Figure 1C:
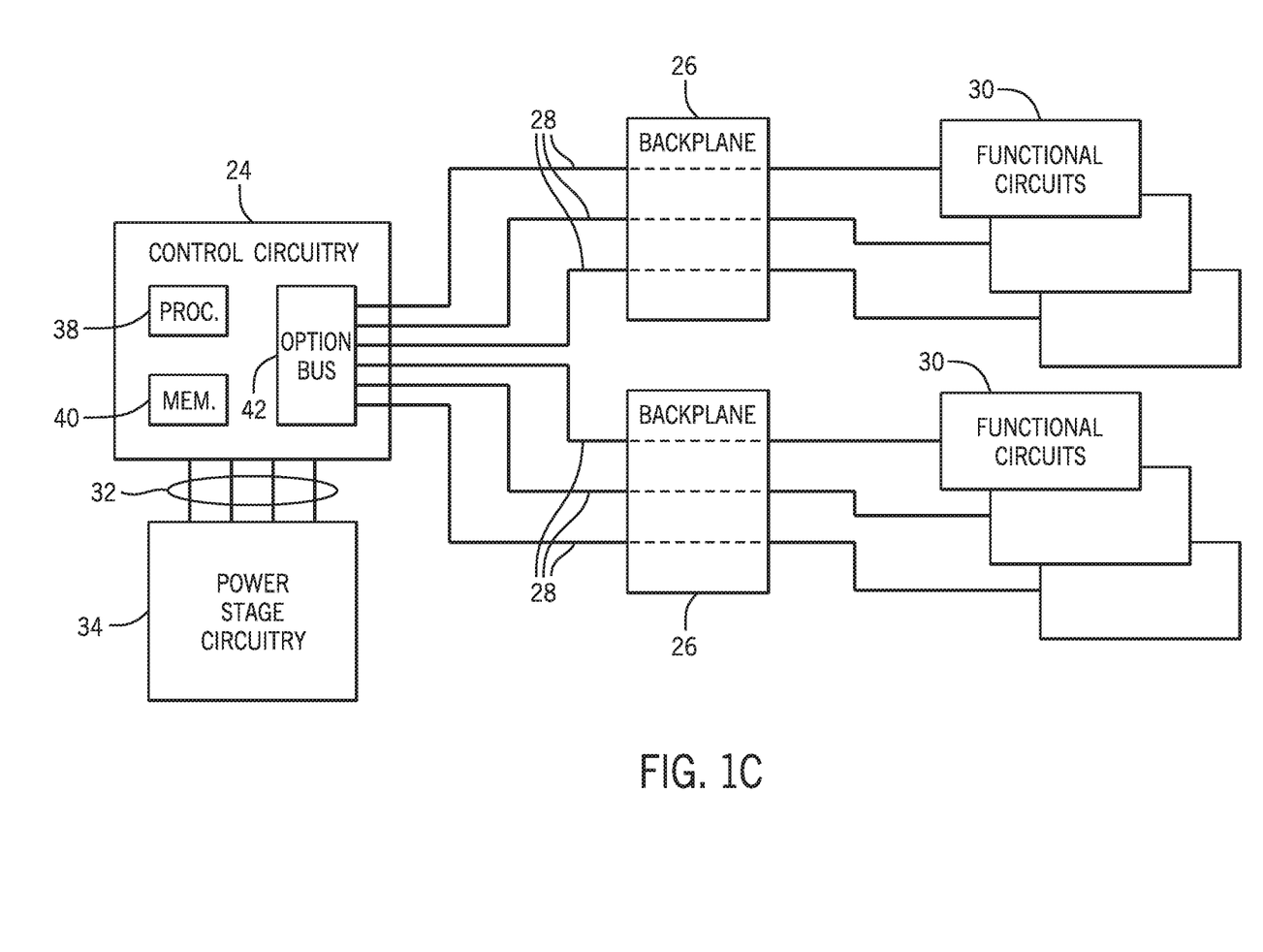
FIG. 1C is a diagrammatical view of certain of the components of the system of FIG. 1A.

A somewhat more detailed view of the control circuitry and a physical backplane is illustrated in FIG. 1C. Certain of the components that may be included in the control circuitry 24 for the communications functions disclosed include a processor 38, memory 40, and an option bus 42 to allow communications with the physical backplane 26 and/or other auxiliary devices. Additionally, the control circuitry 24 may include independent communications controllers for fiber optics, Ethernet, serial, or other communicating means. These additional communications may be used for user input, output to displays, transfer of signals to other computing systems, and/or control to or from auxiliary controllers. The control circuitry 24 will typically include one or more processors 38, which may be any suitable types, such as field programmable gate arrays, multi-core processors, or any other suitable processing circuits. The processors 38 are coupled to memory circuitry 40 that stores a range of configuration routines, operating routines, settings, and so forth. Here again, the memory circuitry 40 may be of any suitable type, including volatile and non-volatile memory. Among the many routines stored in the memory 40 are protocols and images for using the HSI 32 between the control circuitry 24 and the power stage circuitry 34. It should be noted, that these HSI protocols and images may also be stored in the power stage circuitry 34.

The processors 38 are also connected to an option bus 42 to allow communications with the physical backplane 26 and/or other auxiliary devices. The option bus 42 manages communications to and from the functional circuits 30 via one or more physical backplanes 26. One embodiment, as depicted in FIG. 1C, includes two physical backplanes 26, each connecting three functional circuits 30, to the option bus 42 of the control circuitry 24.

Figure 2:
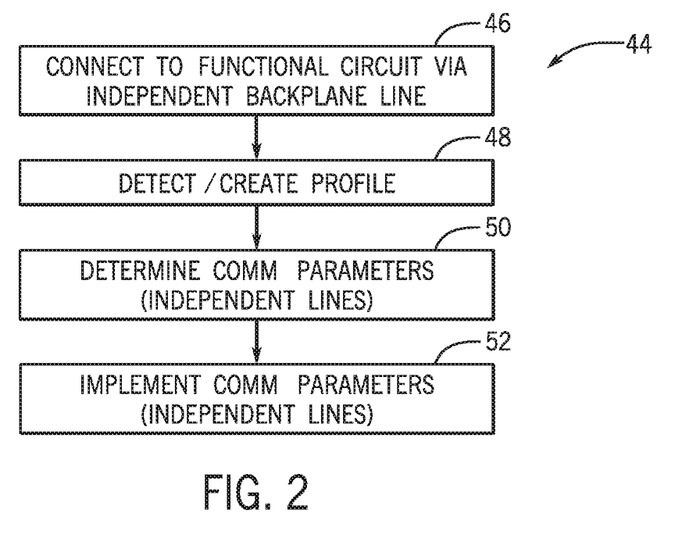
FIG. 2 is a flow chart illustrating example logic for determining communications parameters for use over independent communication lines of a physical backplane.

FIG. 2 illustrates exemplary logic 44 for implementing independently determined communications via the physical backplane 26 and its independent communication lines 28 discussed above. At step 46, the functional circuit 30 is connected via its separate independent communication line 28 on the physical backplane 26. At step 48 a profile for the functional circuit 30 is detected or created. The use of the profile allows for functional circuits 30 to be properly detected and automatically interfaced with the control circuitry 24. The profile may be provided on the functional circuit 30, in memory of the control circuitry 24, or may be created. During the power up evaluation, the control and system event signals for the functional circuits 30 remain at a default speed. The automatic self-identification process allows for communication parameters to be determined for each individual functional circuit 30 to communicate data over its independent line 28 on the physical backplane 26 as indicated at step 50. It is contemplated that different functional circuits 30 will, in any particular application, communicate differently over its independent line 28 of the physical backplane 26 based upon its capabilities and its profile. In general, the capabilities and communication parameters, particularly the interrupt intervals and data rates, will depend upon the nature of the data exchanged with the control circuitry 24. At step 52, then, the communications parameters selected are then implemented for all communications between the functional circuits 30 and the control circuitry 24.

In the present embodiment, the option bus 42 provides an interface between the control circuitry 24 and functional circuits 30 via a drive peripheral interface (DPI) and a high speed serial interface (SI). The drive peripheral interface is based on controller area network (CAN) technology, and is a standard configuration, messaging, and flash file transfer mechanism. The addition of a high speed serial or other high speed interface allows fast transfer of time critical input/output data which cannot be accomplished over a drive peripheral interface. The interfaces may be accomplished using peripheral component interconnect (PCI) connections on the physical backplane 26. Additional connections located directly on the control circuitry 24 or backplane 26 may also be managed by the option bus 42, for example connections to a human interface module (HIM), a remote drive peripheral interface (8-pin MiniDIN), or an insulating displacement contact (IDC) connection. Connections managed by the option bus 42 also have an assignment of port identification. Each connection may have a specific media access control identification (MACID) to identify the functional circuit 30 to the control circuitry 24. These functional circuits may include auxiliary power supplies, network communication cards, encoder interface cards, safety cards, or other input/output cards.

The retention of the device peripheral interface allows for the continued use of legacy functional circuits 30. However, each connection on the backplane 26 will additionally have one or more dedicated serial interface channels connecting the functional circuit 30 directly to the option bus 42 on the control circuitry 24. These independent serial channels allow independent event triggers, for example control and system, to request data transfers independent of each other, and independent of other functional circuits. The control and system events may be separately triggered by the control circuitry, and may be triggered differently for each functional circuit, thus allowing smaller event intervals to improve the performance of functional circuits capable of faster speeds, or for functional circuits operating at slower speeds, but having smaller amounts of information to send. Tailoring the event intervals to each functional circuit allows the optimum performance for each functional circuit.

In the present embodiment, clock performance ranges from 8 MHz to 32 MHz depending on the capabilities of the functional circuit 30, and is set by the functional circuit. The control and system event intervals, however, are triggered by the option bus 42 or control circuitry 24. Many of the current functional circuits are configured to use 256 μs event intervals. However, implementing independent serial channels in the communication lines 28 allows for higher performance functional circuits 30 to have shorter event intervals, for example 125 μs or 62.5 μs, while concurrently running legacy functional circuits at a slower rate. Thus, the control circuitry 24, may communicate with each functional circuit 30 at the optimal performance for each device.

In previous embodiments, such as the backplane and control circuitry of U.S. Pat. No. 8,072,174 issued Dec. 6, 2011, the event signals driven by the control circuitry were triggered at a fixed rate. The event signals could be triggered at one of a plurality of intervals, but once set, the interval did not change and was set the same for each functional circuit. The serial channels allowed different data transfer rates for each functional circuit, as each functional circuit supplied the data rate clock, but the event signals triggered by the control circuitry was not variable across the functional circuits.

The present embodiment, however, allows different event signal intervals for each functional circuit. In order to maintain compatibility with functional circuits 30 that require longer event intervals, the control and/or system event signals triggered by the option bus 42 or control circuitry 24 default to a 256 μs interval during startup and login of the functional circuits. Once profiles are established, the option bus 42 or control circuitry 24 may shorten or lengthen the control and/or system event intervals for individual functional circuits 30 to 125 μs or 62.5 μs depending on the data transfer characteristics of each functional circuit.

Figure 3:
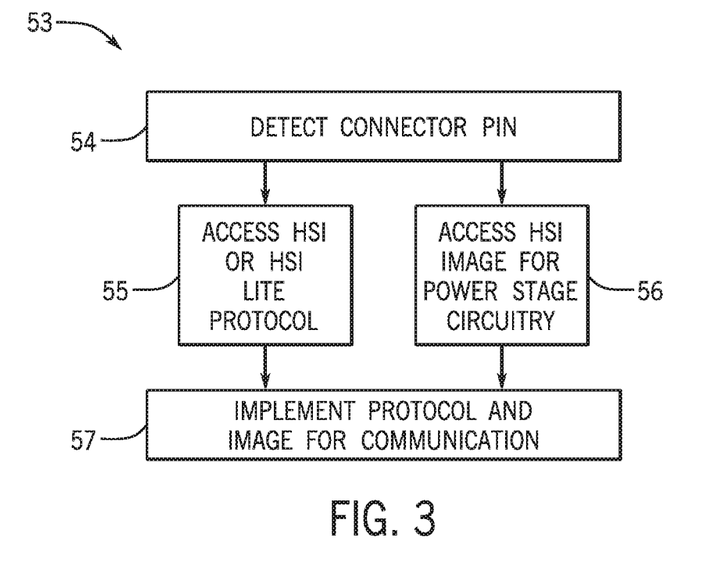
FIG. 3 is a flow chart illustrating example logic for automatically selecting one of a plurality of communication protocols for use in communicating with devices system of the type illustrated in FIG. 1A.

Similarly, the control circuitry 24 connects to a power stage circuitry 34 via the HSI 32, and thus to peripheral devices 22, while maintaining optimal speed. Different protocols, for example the HSI protocol and HSI Lite protocol, may be implemented across the HSI 32 based on required communication speeds and signal processing methodology. An appropriate image may also be chosen to allow proper control signals to be communicated to the power stage circuitry 34. It should also be noted, that the protocol and image selection may be combined as a single image or protocol implementation. In the illustrated volume, the HSI 32, utilizing the HSI protocol, comprises a four lane low voltage differential signal (LVDS) communication structure, each with a data rate of up to 700 Mbps (350 MHz operating via DDR). This structure can provide the 4 lanes in a dual two-lane configuration or a single four-lane configuration for bi-directional operation. In a presently contemplated embodiment the interface allows five classes of signals in its definition, including a power class, a safety class, a system class, a communications class, and a non-volatile storage class. The different protocols and images stored in the memory 40 allow the control circuitry 24 to interface with multiple different power stage circuitry 34 over the HSI 32, and may be chosen automatically by the control circuitry. FIG. 3 illustrates exemplary logic 53 for selecting and implementing the communication protocol. Once the control circuitry 24 is connected to the power stage circuitry 34 via the HSI 32, a unique resistor, positioned in a conductor pin line to produce a corresponding unique voltage, is detected at step 46. Alternative embodiments may allow for digital indication of the desired protocol, or any other automated indication based upon or describing the capabilities of the connected device. Based upon the detected voltage, in the concurrent steps 55 and 56 respectively, the processor accesses either the HSI protocol or the HSI Lite protocol for implementation with the connected device, and accesses the proper image. It should be noted that not all connected devices need use the same protocol, and there may be a plurality of protocols from which to select. The protocol and image are then implemented at step 57.

As stated above, the connector pin voltage determines the protocols and images selected based on the power stage circuitry 34 connected. These power stage circuitry 34 may be for low, medium, or high power motor drives, and may also be used in single or multi-drive applications. Another embodiment may be a panel mount power stage circuitry 34 that utilizes the HSI Lite protocol. The HSI Lite protocol may be configured for digital isolated negative bus reference (NBR), such as for non-differential signal communication (e.g., where optoisolators may add delay to data transfer). The HSI Lite protocol may utilize the same connector pinouts as the HSI protocol and may also operate as a bi-directional four lane interface, but as a single-ended 50 MHz communication link for slower performance over the HSI. This variant has a reduced data transfer rate of 100 Mbps, and may be used for low power and panel mount systems.

For the higher performance motor drive products, the HSI protocol is used. In a contemplated embodiment, the HSI communications protocol may serve as a primary interface to a multi-drive product for communications between the control circuitry 24 and the power stage circuitry 34 (power structure optics, communicating to power devices for converting the power from AC to DC and/or from DC to AC). This may operate at 650 MHz per lane, for example, and the 4 lanes mentioned above may implement bi-directional low voltage differential (LVD) signals.

Figure 4:
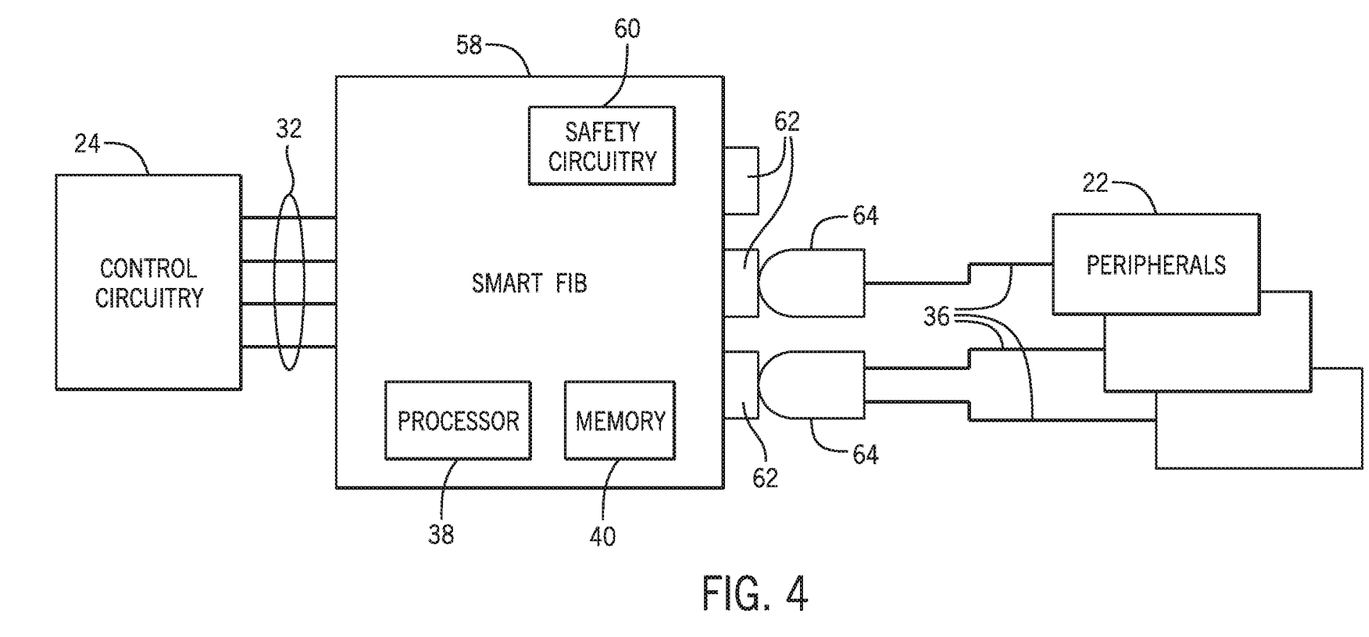
FIG. 4 is a diagrammatical view of certain of the components of the system of FIG. 1A.

In this embodiment, the HSI 32 provides communication between the control circuitry 24 and a specific power stage circuitry 34 illustrated in FIG. 4 as a "Smart FIB" (fiber interface board) 58. The Smart FIB 58 is configured as a high power multi-drive power stage circuitry, but may be adapted for other solutions. The term "Smart FIB" is intended to denote that the power stage circuitry 34 provides communication between the control circuitry 24 and any desired peripherals 22 via multiple independent fiber-optic or conductive communication lines 36 (e.g. fiber optic cables, metallic wires, circuit board lines, etc.). The term is also intended to denote that the Smart FIB 58 has dynamic interval communications with connected peripherals 22 and automatically selects between multiple available protocols, depending upon the configuration and capabilities of each connected peripheral. This has the effect of allowing each connected peripheral 22 to operate at an optimal clock speed independent of the other connected peripherals. This clock speed may effect data acquisition rate, data transfer rate and/or both.

In one embodiment, the automatic detection and configuration of communications between the control circuitry 24 and peripherals 22 connected via fiber optics cables 36 to the Smart FIB 58 may provide for changes to the HSI protocol and/or to communications over the fiber optic lines. These changes may include, for example, interval rates, synchronization of communications to peripherals and firmware control loops, scalable capabilities to choose different rates, changes "on the fly" to accommodate communication protocol determination without shutting down (power cycling) any of the connected devices, changes in rates and communication protocols for the entire drive, when desired, and changes for faster response in some configurations.

The Smart FIB 58 may also include one or more processors 38 and one or more modules for memory 40. Like on the control circuitry 24, the memory 40 on the Smart FIB 58 may retain protocols for communication between the Smart FIB and peripherals 22, including communications routines, settings, timing, and so forth. Furthermore, the Smart FIB utilizes a bandwidth manager to manage communications with one or more connected peripherals 22. Similar to the option bus 42 of the control circuitry 24, the bandwidth manager initializes all peripherals 22 at the same base clock speed. Based on the capabilities of each peripheral device 22, each device may then be clocked at the optimal clock speed for that device.

Additionally, the Smart FIB 58 includes safety circuitry 60 configured to perform safety analysis and/or functions for the peripherals 22, for example the inverter 20. The safety circuitry 60 may also interface with a safety functional circuit 30, attached to the backplane 26, directly over the HSI 32. General power stage circuitry 34 that may be connected via the HSI 32 to the control circuitry 24 may have its own safety circuitry 60. The safety circuitry 60 is located on the power stage circuitry 34 instead of the control circuitry 24 to maintain the control circuitry's compatibility with each power stage circuitry.

In the present embodiment, the Smart FIB 58 includes eleven expansion interfaces 62. When in operation, these expansion interfaces 62 may be fitted with a transceiver card 64 that connects one or more fiber optic lines 36 to the Smart FIB 58. Each transceiver card 64 can support two fiber optic lines 36, or four when peripherals 22 are in a daisy chain topology, thus allowing twenty-two peripheral devices (forty-four when daisy chained) to be connected to the Smart FIB 58. This arrangement of expansion cards allows for a low cost and flexible solution for expanding the number of fiber optic communication lines 36. The physical connections of both the transceiver card 64 to the Smart FIB 58 and the fiber communication lines 36 to the transceiver cards include retaining features such as clips and/or screws.

The interface between the Smart FIB 58 and the transceiver card 64 is a 200 MHz low voltage differential signal bi-directional peripheral component interconnect express (PCIe) connection. The transceiver card 64 transfers data through the fiber optic cables 36 using a Manchester Encoded communication protocol with an embedded clock signal. Additionally, the transceiver card may include a flash over fiber (FOF) capability to provide further control of the peripheral devices 22. A flash over fiber capability allows updates of software and firmware to be implemented via the fiber communication lines 36 to the peripheral devices 22 from the control circuitry 24 via the Smart FIB 58. The components within or immediately connected to the Smart FIB 58 are described as inherent or separate components, however, as can be appreciated by anyone skilled in the art, inherent components could be made separate and separate components such as a transceiver card 64 could be integrated inherently into the Smart FIB in another embodiment.

Figure 5:
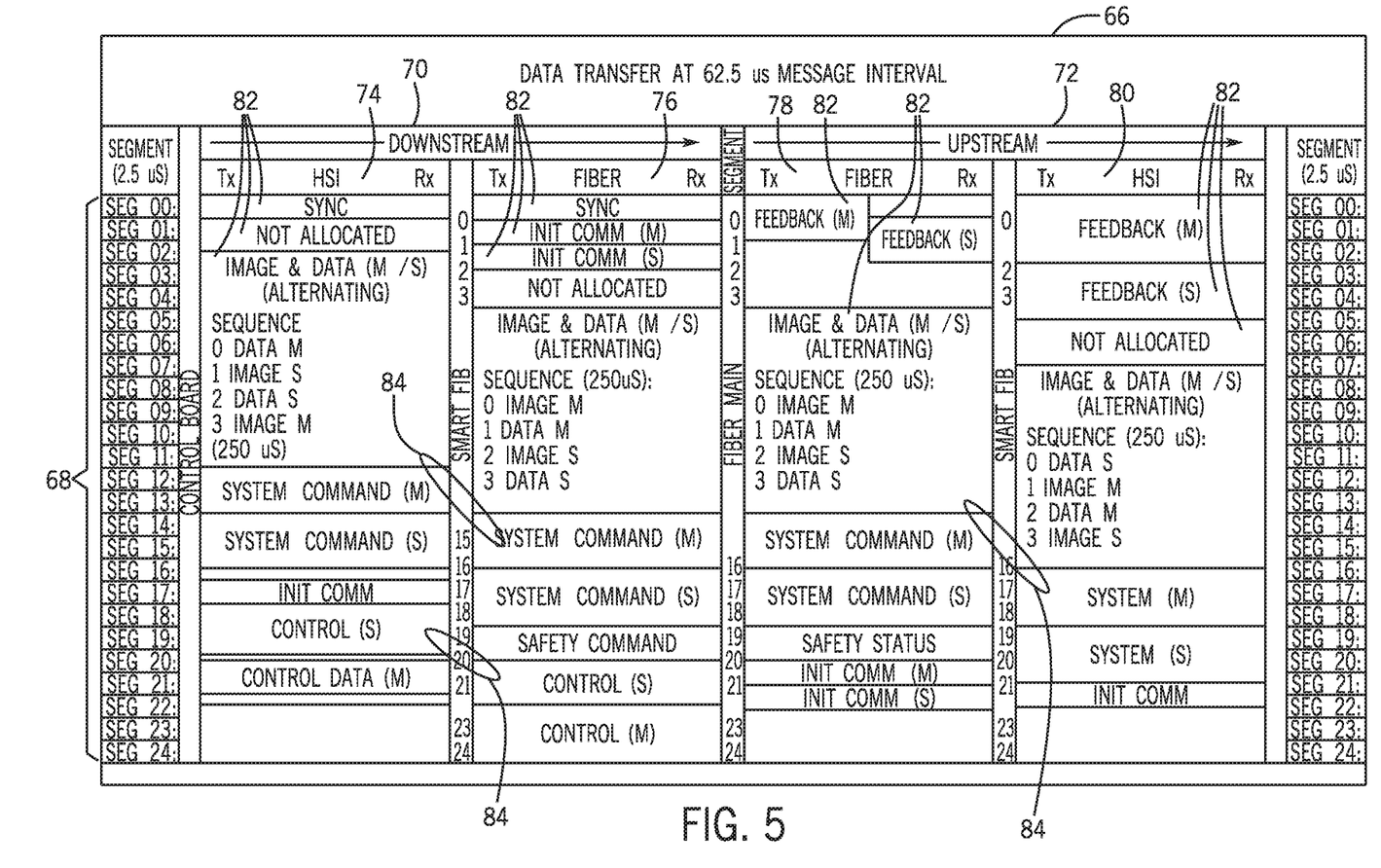
FIGS. 5-7 are timing diagrams illustrating three different protocols having unique messaging or data exchange rates that can automatically selected and used in communicating within the system.
Figure 6:
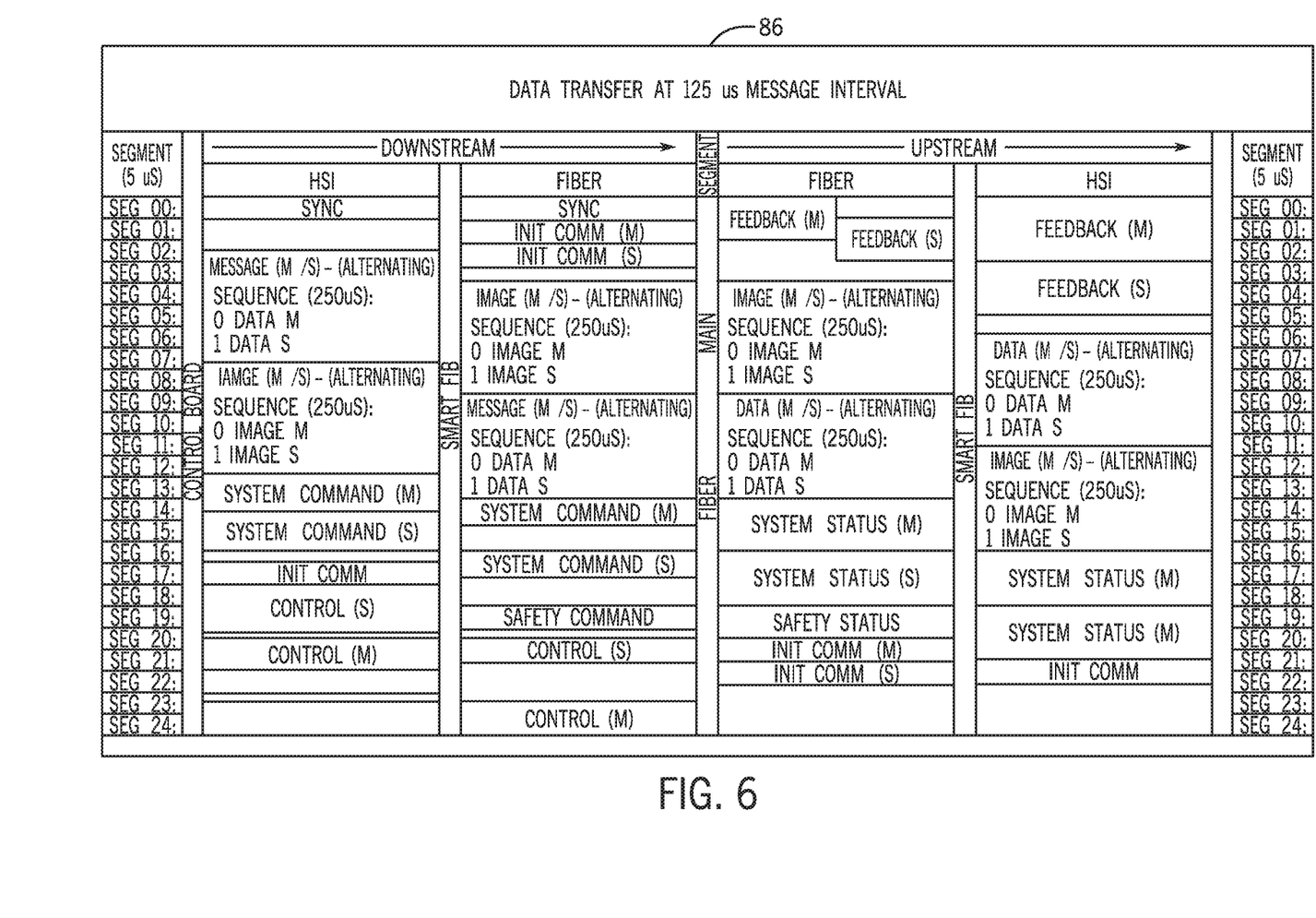
Figure 7:
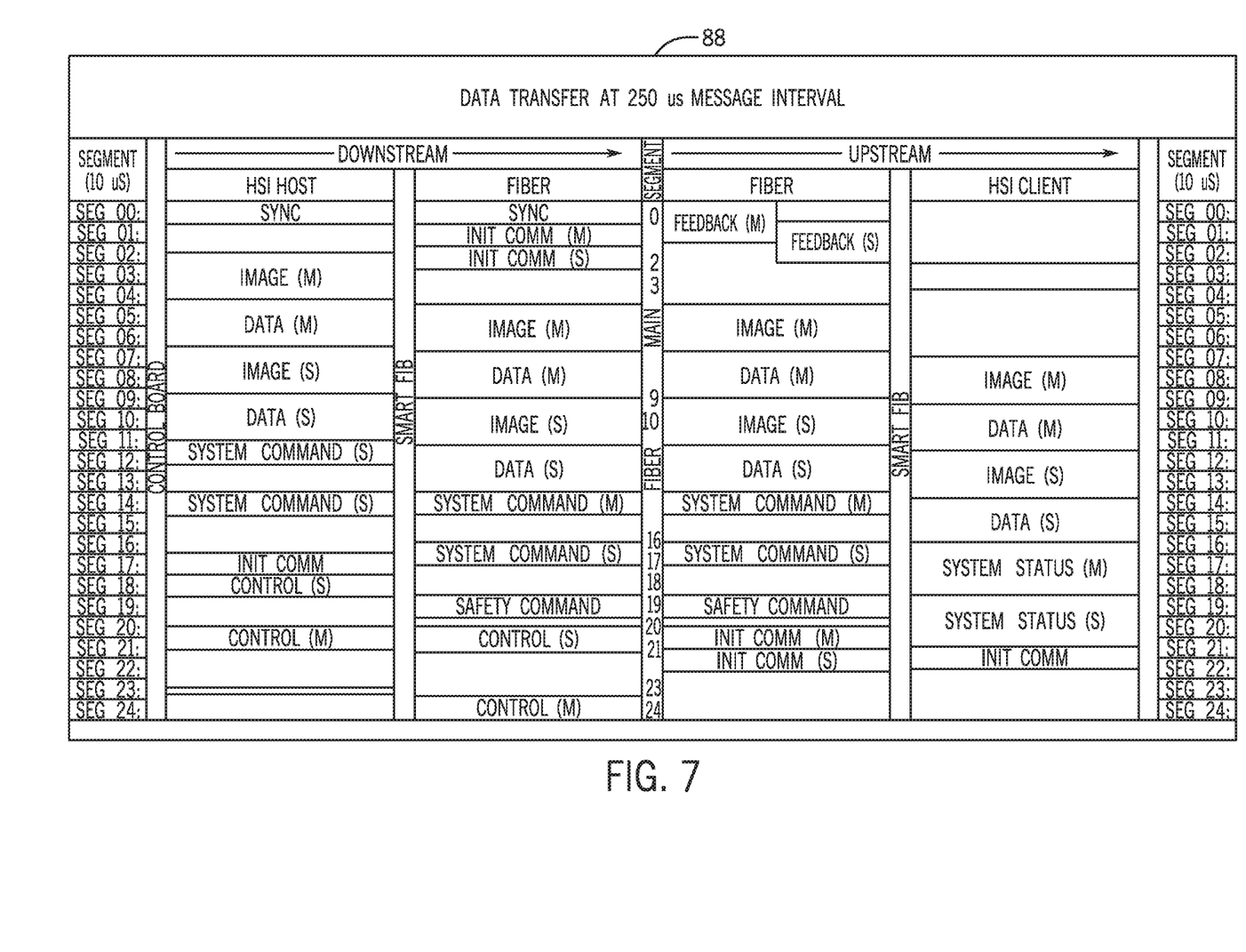

As discussed above, the Smart FIB 58 can automatically detect, configure, and implement data transfer protocols and rates between the control circuitry 24 and any peripheral devices 22. FIGS. 5, 6, and 7 illustrate examples of such configurable data transfer protocols including message intervals, message allocation windows, and so forth. FIG. 5 illustrates a data exchange protocol 66 designed to operate at A 62.5 μs message interval, while FIG. 6 illustrates a similar protocol designed to operate at a 125 μs message interval, and FIG. 7 illustrates a similar protocol designed to operate at a 250 μs message interval. As seen in the figures, and as labeled in FIG. 5, each message interval may be broken down into segments 68, each of which may be allocated for specific data transfer and data type. In the illustrated embodiments, each interval is broken into downstream communications 70 and upstream communications 72. These divisions are further broken into communications via the HSI 32, as indicated by reference numeral 74 (that is, between the control circuitry 24 and the Smart FIB 58) and communications via the fiber optics lines 36, as indicated by reference numeral 76 (that is, between the Smart FIB and the peripherals 22), then again via the fiber optics lines, as indicated by reference numeral 78, and finally again via the HSI, as indicated by reference numeral 80. Within each of these schemes, specific data allocations may be made as indicated by reference 82. Moreover, it may be observed that time shifting of certain data allocations in each successive HSI-to-fiber and fiber-to-HSI transfer may be implemented to provide for transfer via the Smart FIB 58, as indicated generally by reference numeral 84 in FIG. 5.

The devices described herein are configured to work together, however it should be noted that the devices may be adapted to work in other implementations with or without other devices from this disclosure. While only certain features of the invention have been illustrated and described herein, many modifications and changes will occur to those skilled in the art, such as combining devices, separating components of a device, or both. It is, therefore, to be understood that the appended claims are intended to cover all such modifications and changes as fall within the true spirit of the invention.

The invention claimed is:

1. A system comprising: converter circuitry to convert incoming three-phase power to DC power; inverter circuitry to convert the DC power to three-phase controlled frequency AC power to drive a motor; control circuitry coupled to the inverter circuitry and configured to apply control signals to the inverter circuitry for conversion of the DC power to the controlled frequency AC power; and communications circuitry comprising a bandwidth manager and coupled for data communication between the control circuitry and a plurality of peripheral devices including at least the inverter circuitry, wherein the bandwidth manager of the communications circuitry implements a dynamic interval communications protocol having a plurality of data transfer schemes each having different respective data transfer intervals and data allocations; wherein the data allocation for each respective data transfer scheme comprises unique data transfer and data type specifications including allocations for downstream communications and for upstream communications, allocations for communications between the communications circuitry and the control circuitry; and allocations for communications between the communications circuitry and peripherals; and wherein the bandwidth manager of the communications circuitry is configured to select a different data transfer scheme for different peripheral devices based upon capabilities of each respective peripheral device, wherein the data allocations for each respective data transfer scheme includes time shifting of data allocations in between successive high speed interface lines and fiber optic communications circuitry and between fiber optic communications circuitry and high speed interface lines.

2. The system of claim 1, wherein the communications circuitry is fiber optic communications circuitry, and is configured to be coupled to the peripheral devices via respective fiber optic conductors.

3. The system of claim 1, wherein each data transfer scheme comprises timing for transfer of data between the control circuitry and the communications circuitry via high speed interface lines, and then from the communications circuitry to the peripheral devices.

4. The system of claim 1, wherein the communications circuitry comprises onboard safety circuitry configured to monitor and control the safety functions of the system.

5. The system of claim 1, wherein the data transfer schemes comprise three different schemes having different respective data allocations comprising respective different data transfer and data type specifications including allocations for downstream communications and for upstream communications, respective different allocations for communications between the communications circuitry and the control circuitry, and respective different allocations for communications between the communications circuitry and peripherals.

6. The system of claim 1, wherein the communications circuitry comprises a plurality of expansion ports.

7. The system of claim 6, wherein each expansion port, in operation, is fitted with an expansion card allowing coupling of additional peripheral devices.

8. A system comprising: converter circuitry to convert incoming three-phase power to DC power; inverter circuitry to convert the DC power to three-phase controlled frequency AC power to drive a motor; control circuitry coupled to the inverter circuitry and configured to apply control signals to the inverter circuitry for conversion of the DC power to the controlled frequency AC power; and fiber optic communications circuitry coupled for data communication between the control circuitry and a plurality of peripheral devices including at least the inverter circuitry, wherein the control circuitry implements a dynamic interval communications protocol having a plurality of data transfer schemes each having different respective data transfer intervals and data allocations; wherein the data allocation for each respective data transfer scheme comprises unique data transfer and data type specifications including allocations for downstream communications and for upstream communications, allocations for communications between the communications circuitry and the control circuitry, and allocations for communications between the communications circuitry and peripherals; and wherein the fiber optic communications circuitry is configured to select a different data transfer scheme for different peripheral devices based upon capabilities of each respective peripheral device, wherein the data allocations for each respective data transfer scheme includes time shifting of data allocations in between successive high speed interface lines and fiber optic communications circuitry and between fiber optic communications circuitry and high speed interface lines.

9. The system of claim 8, wherein the fiber optic communications circuitry is configured to be coupled to the peripheral devices via respective fiber optic conductors.

10. The system of claim 8, wherein each data transfer scheme comprises timing for transfer of data between the control circuitry and the fiber optic communications circuitry via high speed interface lines, and then from the fiber optic communications circuitry to the peripheral devices via fiber optic conductors.

11. The system of claim 8, wherein the fiber optic communications circuitry comprises onboard safety circuitry configured to monitor and control the safety functions of the system.

12. The system of claim 8, wherein the data transfer schemes comprise three different schemes having different respective data allocations comprising respective different data transfer and data type specifications including allocations for downstream communications and for upstream communications, respective different allocations for communications between the communications circuitry and the control circuitry, and respective different allocations for communications between the communications circuitry and peripherals.

13. The system of claim 8, wherein the fiber optic communications circuitry comprises a plurality of expansion ports, wherein each expansion port, in operation, is fitted with an expansion card allowing coupling of additional peripheral devices via additional fiber optic conductors.

14. A method comprising: converting incoming three-phase power to DC power using converter circuitry; inverting the DC power to three-phase controlled frequency AC power to drive a motor using inverter circuitry; controlling the inverting circuitry via control circuitry; communicating between the control circuitry and peripheral devices including at least the inverter circuitry using fiber optic communications circuitry, wherein the fiber optic communications circuitry implements a dynamic interval communications protocol having a plurality of data transfer schemes each having different respective data transfer intervals and data allocations; wherein the data allocation for each respective data transfer scheme comprises unique data transfer and data type specifications including allocations for downstream communications and for upstream communications, allocations for communications between the communications circuitry and the control circuitry, and allocations for communications between the communications circuitry and peripherals; and wherein the fiber optic communications circuitry is configured to select a different data transfer scheme for different peripheral devices based upon capabilities of each respective peripheral device, wherein the data allocations for each respective data transfer scheme includes time shifting of data allocations in between successive high speed interface lines and fiber optic communications circuitry and between fiber optic communications circuitry and high speed interface lines.

15. The method of claim 14, wherein the fiber optic communications circuitry comprises a plurality of expansion ports, wherein each expansion port, in operation, is fitted with an expansion card allowing coupling of additional peripheral devices via additional fiber optic conductors.

16. The method of claim 14, wherein the fiber optic communications circuitry comprises onboard safety circuitry configured to monitor and control the safety functions of the system.

17. The method of claim 14, wherein the data transfer schemes comprise three different schemes having different respective data allocations comprising respective different data transfer and data type specifications including allocations for downstream communications and for upstream communications, respective different allocations for communications between the communications circuitry and the control circuitry, and respective different allocations for communications between the communications circuitry and peripherals.

* * * * *